US006002947A

United States Patent [19]

Smith

[11] Patent Number: 6,002,947

[45] **Date of Patent: *Dec. 14, 1999**

[54] ANTENNA ARRAY CONFIGURATION

[75] Inventor: Martin Stevens Smith, Chelmsford, United Kingdom

[73] Assignee: Nortel Networks Corporation, Richardson, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,157

[22] Filed: Jul. 9, 1996

[30] Foreign Application Priority Data

Jul. 18, 1995 [GB] United Kingdom .................. 9514660

[51] Int. Cl.[6] .............................. H04B 1/38; H04M 1/00

[52] U.S. Cl. .......................... 455/562; 455/103; 455/272; 343/844

[58] Field of Search ................................ 455/52.1, 52.3, 455/63, 65, 272, 277.1, 277.2, 132, 133, 134, 135, 129, 121, 123, 53.1, 562, 101, 103; 375/347; 343/844; 342/380, 381, 383, 384, 368, 372

[56] References Cited

U.S. PATENT DOCUMENTS

| | | | |
|---|---|---|---|
| 4,519,096 | 5/1985 | Cerny, Jr. | 455/137 |
| 4,843,402 | 6/1989 | Clement | 343/844 |
| 5,168,472 | 12/1992 | Lockwood | 367/119 |
| 5,576,717 | 11/1996 | Searle et al. | 342/372 |

FOREIGN PATENT DOCUMENTS

0374008 A1 12/1989 European Pat. Off. .

OTHER PUBLICATIONS

"The ARRL Antenna Book", Published by The American Radio Relay League, Newington, CT. 06111 Fig. 19, p. 19–10 to p. 19–12.

41st IEEE Vehicular Technology Conference, May 19–22, 1991, St. Louis, MO, pp. 166–171 article, "Microstrip Base Antennas For Cellular Communications", p. 166, paragraph 2 to p. 168, paragraph 4, fig. 4–8, Strickland et al.

Microstrip Base Station Antennas for Cellular Communictions, Peter Strickland and Fazal Bacchus, 1991 IEEE, pp. 166–171.

Transmitting Null Beam Forming with Beam Space Adaptive Array Antennas, Isamu Chiba, Toshiyuki Takahashi, and Yoshio Karasawa, 1994 IEEE, pp. 1498–1502.

A Spectrum Efficient Cellular Base–station Antenna Architecture, S.C. Swales and M.A. Beach, Centre for Communications Research, University of Bristol, UK.

*Primary Examiner*—Andrew I. Faile
*Assistant Examiner*—Christopher Onuaku
*Attorney, Agent, or Firm*—John D. Crane

[57] ABSTRACT

A base station arrangement for a cellular radio system comprising an antenna array, is disclosed. The downlink signals transmitted from antennas have a spacing which is scaled in proportion to the transmitted and received wavelengths. A method of operation is also disclosed.

12 Claims, 2 Drawing Sheets

A SIGNAL TRANSMITTED FROM THE MOBILE REACHES THE BASESTATION HAVING TRAVELLED VIA A NUMBER OF PATHS WHICH EXIST AS A RESULT OF SCATTERING FROM OBSTACLES RANDOMLY DISTRIBUTED ON A CIRCLE SURROUNDING THE MOBILE

A SIGNAL TRANSMITTED FROM THE MOBILE REACHES THE BASESTATION HAVING TRAVELLED VIA A NUMBER OF PATHS WHICH EXIST AS A RESULT OF SCATTERING FROM OBSTACLES RANDOMLY DISTRIBUTED ON A CIRCLE SURROUNDING THE MOBILE

ANTENNA ARRAY CONFIGURATION

FIELD OF THE INVENTION

This invention relates to cellular radio communication systems and in particular relates to an antenna array configuration.

BACKGROUND ART

Cellular radio systems are currently in widespread use throughout the world providing telecommunications to mobile users. In order to meet the capacity demand, within the available frequency band allocation, cellular radio systems divide a geographic area to be covered into cells. At the centre of each cell, there is a base station through which the mobile stations communicate, each base station typically being equipped with antenna arrays arranged sectors. Configurations of three or six sectors (sub-cells) are often employed, where the higher gain of correspondingly narrower beamwidth antennas improve the uplink from the lower power mobiles. The distance between the cells is determined such that co-channel interference is maintained at a tolerable level.

Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions. A receiver moving through this spatially varying field experiences a fading rate which is proportional to its speed and the frequency of the transmission. Since the various components arrive from different directions, there is also a Doppler spread in the received spectrum.

When a new cellular radio system is initially deployed, operators are often interested in maximising the uplink (mobile to base station) and downlink (base station to mobile station) range. The ranges in many systems are uplink limited due to the relatively low transmitted power levels of hand portable mobile stations. Any increase in range means that fewer cells are required to cover a given geographic area, hence reducing the number of base stations and associated infrastructure costs.

The range of the link, either the uplink or the downlink, can be controlled principally in two different ways: by adjusting either the power of the transmitter or the gain at the receiver. On the downlink the most obvious way of increasing the range is to increase the power of the base station transmitter. To balance the link the range of the uplink must also be increased by an equivalent amount. The output power of a transmitter on a mobile, however, is constrained to quite a low level to meet national regulations, which vary on a country to country basis. Accordingly the receive gain at the base station must be increased.

The principal method of improving the receive system gain and to reduce the effect of fading is to include some form of diversity gain in addition to the receive antenna gain. The object of a diverse system is to provide the receiver with more than one path, with the paths being differentiated from each other by some means, e.g. space, angle, frequency or polarisation. The use of these additional paths by the receiver provides the diversity gain. The amount of gain achieved depends upon the type of diversity, number of paths, and method of combination.

Cellular radio base stations frequently use two antennas for diversity reception on the uplink, spaced by many (e.g. 20) wavelengths. This large spacing is required because the angular spread of the incoming signals is narrow. This can be represented as a ring of scatterers around a mobile user who is transmitting to a base station otherwise known as the uplink path and such an arrangement is shown in FIG. 1. For example the radius of scatterers may be 50 to 100 meters, and the range to the base station may be up to 10 km, resulting in a narrow angular spread. A large antenna spacing is required at the base station to provide decorrelated fading, which can be calculated from the Fourier transform relationship between antenna array aperture and angular width (a large aperture in wavelengths provides a narrow beam).

In order to improve wanted signals and discriminate against interfering signals, antennas are being developed which utilise an array of antenna elements at the base station, allied with an "intelligent" beamformer. One such technique is to use a multichannel maximal ratio combiner on reception at the base station array. This operates by weighting the array signals $s_i$ (i=1 to N, where N=the number of elements in the array) with their complex conjugates $s_i^*$ (assuming equal noise powers on each channel) and summing to give:

$$S = \sum_{i=1}^{N} s_i * s_i = \sum_{i=1}^{N} |s_i|^2.$$

For a N element array, this provides both array gain (approximately a factor N in power) and diversity gain, the latter only if at least some of the array elements are widely spaced. Thus a factor N improvement in mean signal level can be achieved, allowing extended range or lower mobile transmit power. The array provides narrower beams than a single antenna element, and hence also provides better protection against interference, improving carrier to interference ratios and hence allowing higher capacity systems by reducing re-use factors.

The limitation of the above is that the improvements are only for the uplink, and not for the downlink (base station transmit to the mobile). This invention is concerned with spatially diverse systems and in particular seeks to provide an arrangement wherein downlink performance is improved.

A standard feature of a number of cellular radio systems is that the sets of uplink and downlink frequencies are separated into two distinct bands spaced by a guard band, for example 1800–1850 MHz (uplink) and 1900 1950 MHz (downlink). Up- and down- link frequencies are then paired off, e.g. 1800 with 1900, 1850 with 1950. There is therefore a significant change of frequency (e.g. 5%) between up and down links. There is consequently no correlation for the fast fading (as the mobile moves) between up and down links.

SUMMARY OF THE INVENTION

In accordance with the present invention, there is provided a base station arrangement comprising an antenna array, wherein the uplink signals received and downlink signals transmitted from the antenna array use inter-element spacings which are scaled in proportion to the wavelengths for the up- and down- links. Complex array weights, e.g. maximal ratio combining weights can be used for the uplink, and reused for the downlink.

In accordance with another aspect of the present invention, some of the antenna elements are employed for both the uplink and downlink signals. By not employing all the antenna elements in an array, signal processing can be simplified.

In accordance with another aspect of the present invention, there is provided a method of operating a base station arrangement comprising an antenna receive array and an antenna transmit array, the method comprising the steps, in a transmit mode, of transmitting downlink signals to the mobile by feeding signals to be transmitted to a transmit array having an array spacing which is scaled in proportion to the transmitted and received wavelengths. The method can further comprise the step of determining complex array weights in receive mode, for a received signal from a mobile, wherein, in subsequent transmit mode to such a mobile, the uplink weights are employed to define the beam for the downlink.

The method of combining the uplink signals can be performed by the use of maximal ratio combining, with the method of transmitting the downlink signal employing the uplink weights.

DESCRIPTION OF THE DRAWINGS

In order that the invention may be more fully understood, reference will now be made to the figure as shown in the accompanying drawing sheets, wherein:

In a base station employing maximal ratio combining for the uplink, the two frequencies involved are typically too far apart for any fast fading, which occurs as the mobile moves, to be correlated at a given array element. Such fading can be quite rapid. The wave fronts that appear at the array may be such that the array weights required for the two frequencies are reasonably similar. If so, the uplink weights could provide reasonable gain if used for the downlink. FIG. 2 shows the array gain for a four element array using the uplink maximal ratio combining weights for both up and down links, for a particular scenario, as a function of array inter-element spacing. These results show gain averaged through the fast fading and are for the case of a mobile positioned broadside to the array. The uplink gain rises above 6 dB (N=4) due to diversity gain (this part is dependent on the error rate). No diversity gain occurs on the downlink due to frequency decorrelation of the weights and the signals. Significant array gain, however, is available on the downlink, provided that the array spacing is not too large. It is then possible to select an array spacing such that array gain and significant diversity gain are available on the uplink and there is still significant array gain for the downlink, for example with an array spacing of 7–10 wavelengths.

FIG. 3 shows the corresponding results for the case where the mobile position is moved to 30 degrees from broadside ($\alpha$=30°). Three curves show respectively: i) uplink gain including diversity; ii) downlink gain with uplink weights and spacing scaled in relation to the down- and up-link wavelengths; and iii) downlink gain without adjusted spacing. The lowest gain curve (iii) uses the same array for uplink and downlink, and suffers from "aperture dispersion". This is the effect of beam squint due to the difference in frequencies which does not occur in the broadside case. This can be corrected, as shown in the higher gain downlink curve (ii), by using a separate array for the downlink with inter-element spacing scaled in proportion to the two wavelengths involved. For a 5% frequency shift between up and down links, an array length of 20λ1 becomes 21λ2. For a 30 degree steering angle, a half wavelength phase error would be introduced, causing cancellation rather than addition of signals from the end elements unless the spacing is corrected. Correcting phase shifts would be ambiguous unless directional information is available. A particular feature of this approach is that the pairing of up and down link frequencies means that the effect of scaling the array spacings works well across the whole band of the cellular radio system (the ratio 1900/1800 is very similar to 1950/1850).

Figure 1:
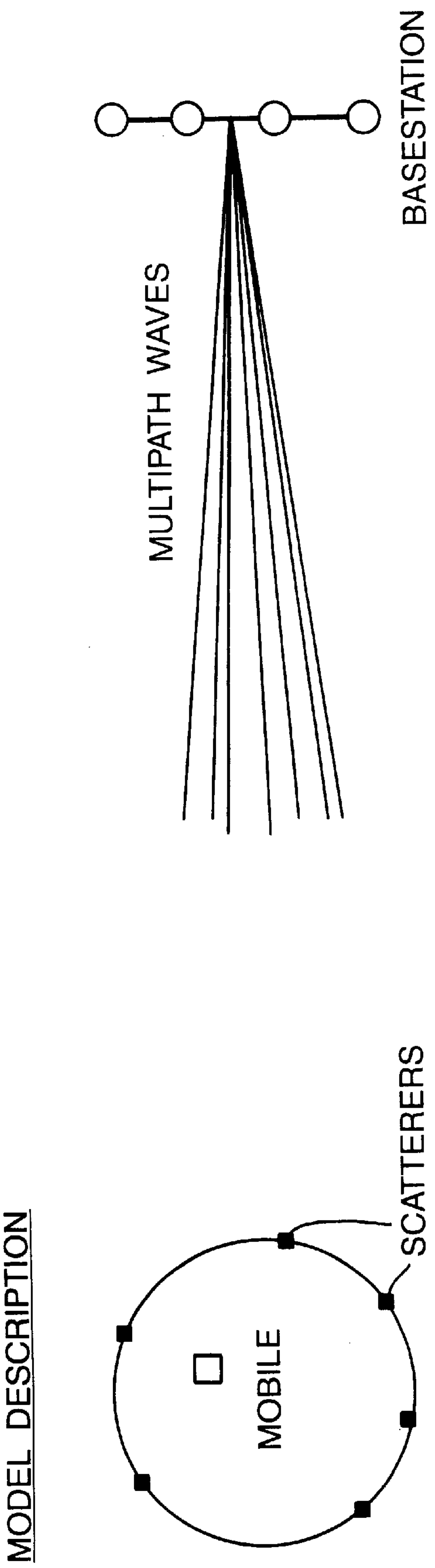
FIG. 1 shows a downlink signal scattering model.
Figure 2:
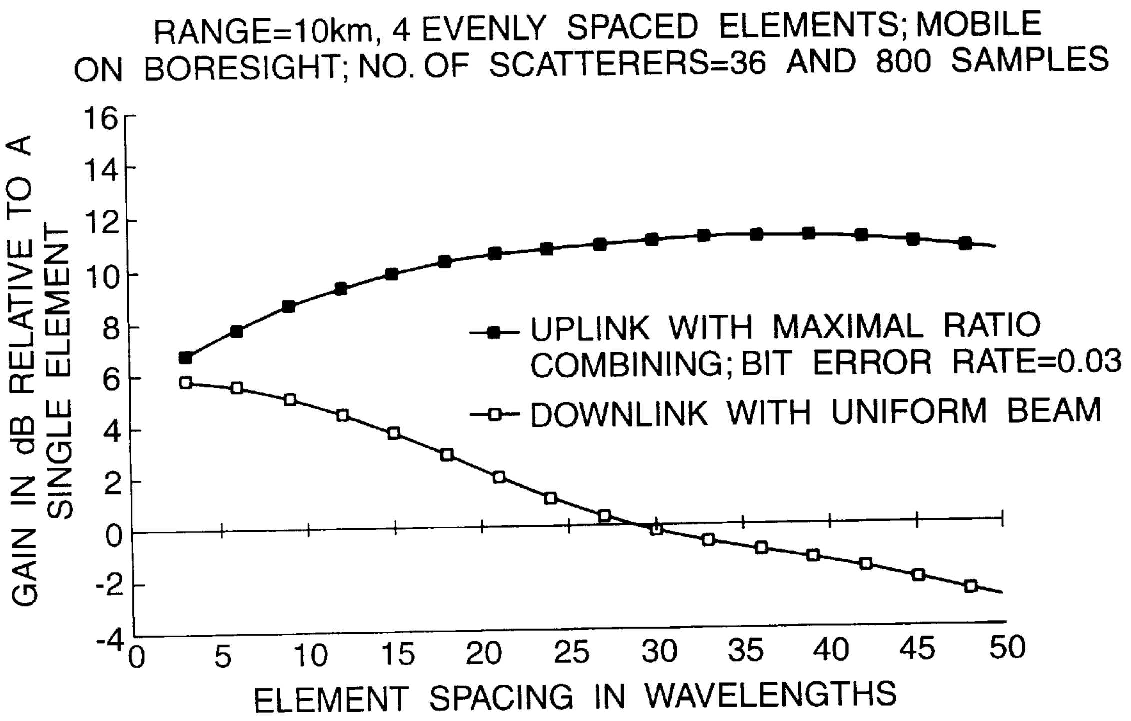
FIG. 2 is a graph detailing uplink and downlink gain versus antenna element spacing for a 4-element antenna array, with a mobile at broadside.
Figure 3:
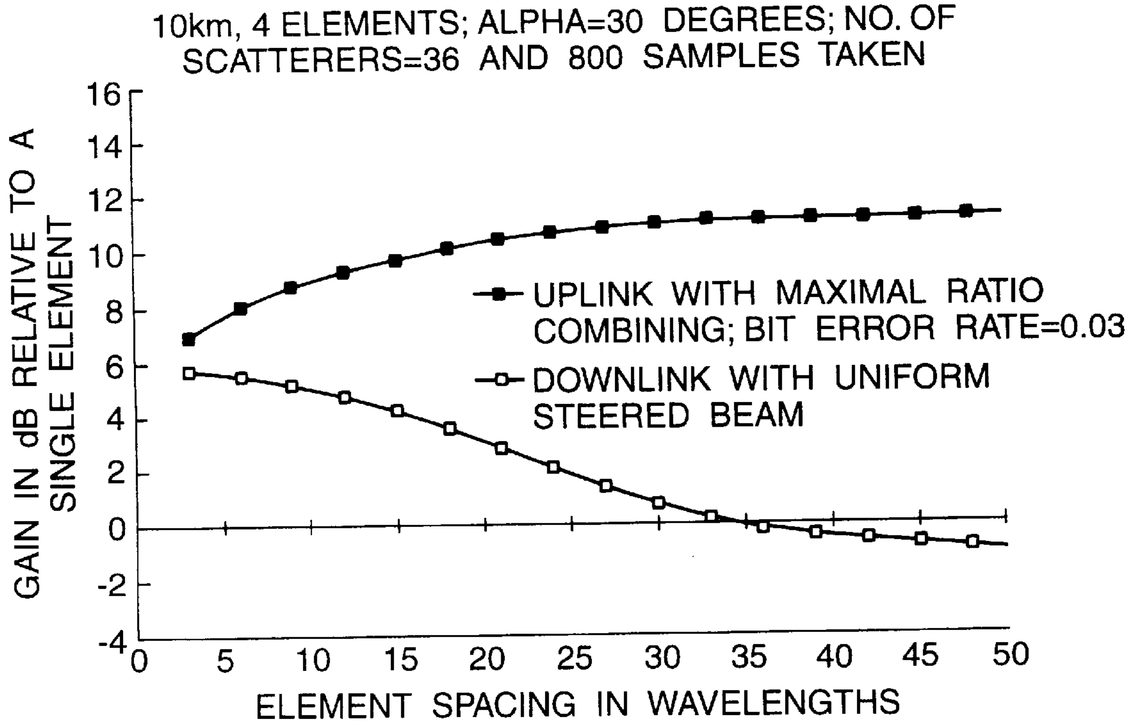
FIG. 3 is a graph detailing uplink and downlink gain versus antenna element spacing for a 4-element antenna array, with a mobile at 30° from broadside.

Note that the downlink array spacings are scaled from whichever spacings are used in the uplink array. A special case arises if an array with a small spacing is employed. With reference to the left hand portion of the curves in FIGS. 2 and 3, it is shown that where the downlink gain is maximum, scaling has a relatively small effect. We can then consider an array where some closely spaced elements are used both for the uplink and downlink signals, with the option of adding one or more widely spaced elements to provide diversity gain for the uplink. Scaled spacing downlink elements could be associated with these if desired.

I claim:

1. A cellular radio base station arrangement comprising a phased array of antenna receive elements and a phased array of antenna transmit elements, each array having controllable weighting for the array elements, wherein transmit antennas have an array inter-element spacing which is scaled relative to array inter-element spacing of the receive antenna in proportion to transmitted and received wavelengths where the transmitted and received wavelengths are different.

2. An arrangement according to claim 1 wherein complex array weights are used for the uplink and are re-used for the downlink.

3. An arrangement according to claim 1 wherein maximal ratio combining complex array weights are used for the uplink and are re-used for the downlink.

4. An arrangement according to claim 1 wherein some antenna elements are employed for both the uplink and downlink signals.

5. A method of operating a cellular radio base station arrangement comprising a phased array of antenna receive elements and a phased array of antenna transmit elements, each array having controllable weighting for the array elements, the method comprising the steps, in a transmit mode, of transmitting signals to the mobile by feeding signals to be transmitted to a transmit array having an array inter-element spacing which is scaled relative to array inter-element spacing of the receive antenna in proportion to the transmitted and received wavelengths where the transmitted and received wavelength are different.

6. A method of operating a base station arrangement according to claim 5 further comprising the steps of:

determining complex array weights in receive mode, for a received signal from a mobile, wherein, in subsequent transmit mode to such a mobile, the uplink weights are employed to define the beam for the downlink.

7. A method according to claim 5 wherein maximal ratio combining complex array weights are used for the uplink and are re-used for the downlink.

8. A method according to claim 5 wherein some antenna elements are employed for both the uplink and downlink signals.

9. A method of operating a cellular radio base station arrangement comprising a phased array of antenna receive elements and a phased array of antenna transmit elements, each array having controllable weighting for the array elements, the method comprising the steps, in a receive mode, of receiving signals from a mobile by feeding via a receive array having an array inter-element spacing which is scaled relative to array inter-element spacing of the transmit antennas in proportion to the transmitted and received wavelengths where the transmitted and received wavelengths are different.

10. A method according to claim 9 further comprising the steps of:

determining complex array weights in receive mode, for a received signal from a mobile, where, in subsequent transmit mode to such a mobile, said complex array weights of said receive mode are employed to define the beam for the downlink.

11. A method according to claim 9 wherein maximal ratio combining complex array weights are used for the uplink and are re-used for the downlink.

12. A method according to claim 9 wherein some antenna elements are employed for both the uplink and downlink signals.

* * * * *